US012720005B2

(12) United States Patent
Falb et al.

(10) Patent No.: US 12,720,005 B2
(45) Date of Patent: Aug. 25, 2026

(54) IMAGING AND DISPLAY SYSTEM COMBINING IR AND COLOR VIDEO STREAMS

(71) Applicant: Gentex Corporation, Zeeland, MI (US)

(72) Inventors: David M. Falb, Grand Rapids, MI (US); Brian S. Lorence, Washington, MI (US); Brian J. Barksdale, Grand Rapids, MI (US); Brian G. Brackenbury, Grand Haven, MI (US); Bradley A. Bosma, Hudsonville, MI (US); Craig L. Piersma, Wyoming, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 18/828,311

(22) Filed: Sep. 9, 2024

(65) Prior Publication Data

US 2025/0088604 A1 Mar. 13, 2025

Related U.S. Application Data

(60) Provisional application No. 63/581,490, filed on Sep. 8, 2023.

(51) Int. Cl.
*H04N 5/33* (2023.01)
*H04N 5/265* (2006.01)

(52) U.S. Cl.
CPC ............... *H04N 5/33* (2013.01); *H04N 5/265* (2013.01)

(58) Field of Classification Search
CPC ................ B60R 1/26; B60R 2300/105; B60R 2300/303; B60R 2300/8026; B60R 2300/70; B60R 2300/8066; B60R 1/27; H04N 5/265; G06T 2207/10048; G06T 2207/20221; G06T 5/50;
(Continued)

(56) References Cited

U.S. PATENT DOCUMENTS

| | | | |
|---|---|---|---|
| 6,097,024 | A | 8/2000 | Stam et al. |
| 6,681,163 | B2 | 1/2004 | Stam et al. |

(Continued)

FOREIGN PATENT DOCUMENTS

| | | |
|---|---|---|
| CN | 113447136 | 9/2021 |
| KR | 100928292 B1 | 11/2009 |

(Continued)

*Primary Examiner* — Masum Billah
(74) *Attorney, Agent, or Firm* — Price Heneveld LLP; Brian James Brewer

(57) ABSTRACT

An imaging and display system is provided for a vehicle having: a video display disposed in an interior of the vehicle; a visible light video camera configured to capture a visible light video stream of a scene in a visible region of the electromagnetic spectrum; a long-range IR video camera configured to capture an IR video stream of the scene in an IR region of the electromagnetic spectrum; and a processing circuit for receiving the visible light video stream and the IR video stream for generating a composite video stream including at least part of the visible light video stream superimposed with at least part of the IR video stream, the processing circuit configured to supply the composite video stream to the video display for display thereon.

14 Claims, 8 Drawing Sheets
(4 of 8 Drawing Sheet(s) Filed in Color)

(58) Field of Classification Search
CPC . G06T 2207/10024; G06T 2207/10004; G06T 2207/10012; G06T 2207/20021; G06T 2207/20212
USPC ........................................................ 348/164
See application file for complete search history.

(56) References Cited

U.S. PATENT DOCUMENTS

| | | | | |
|---|---|---|---|---|
| 9,254,789 | B2 | 2/2016 | Anderson et al. | |
| 9,514,373 | B2 | 12/2016 | Jeromin et al. | |
| 9,637,054 | B2 | 5/2017 | VanderPloeg et al. | |
| 9,834,146 | B2 | 12/2017 | VanderPloeg et al. | |
| 10,380,154 | B2 | 8/2019 | Boxwell et al. | |
| 2010/0201816 | A1* | 8/2010 | Lee | B60R 1/12 349/1 |
| 2014/0198213 | A1 | 7/2014 | Liken et al. | |
| 2015/0266427 | A1 | 9/2015 | VanderPloeg et al. | |
| 2018/0240251 | A1* | 8/2018 | Kitagawa | G06T 7/73 |
| 2023/0166662 | A1 | 6/2023 | Bosma et al. | |

FOREIGN PATENT DOCUMENTS

| | | | | | |
|---|---|---|---|---|---|
| KR | 101830296 | B1 | | 2/2018 | |
| KR | 20190070271 | A | * | 6/2019 | G06T 7/11 |
| KR | 1020190070271 | A | | 6/2019 | |
| KR | 1020230101974 | A | | 7/2023 | |
| WO | WO-2023204083 | A1 | * | 10/2023 | H04N 23/61 |

* cited by examiner

IMAGING AND DISPLAY SYSTEM COMBINING IR AND COLOR VIDEO STREAMS

CROSS-REFERENCE TO RELATED APPLICATION

This application claims priority to and the benefit under 35 U.S.C. § 119(e) of U.S. Provisional Patent Application No. 63/581,490, filed on Sep. 8, 2023, entitled "IMAGING AND DISPLAY SYSTEM COMBINING IR AND COLOR VIDEO STREAMS," by David M. Falb et al., the entire disclosure of which is incorporated herein by reference.

BACKGROUND OF THE INVENTION

The present invention generally relates to processing of video images streamed to a display, and more specifically to processing of streamed video images of scenes exterior to a vehicle.

SUMMARY OF THE INVENTION

According to one aspect of the present invention, an imaging and display system is provided for a vehicle having: a video display disposed in an interior of the vehicle; a visible light video camera configured to capture a visible light video stream of a scene in a visible region of the electromagnetic spectrum; a long-range IR video camera configured to capture an IR video stream of the scene in an IR region of the electromagnetic spectrum; and a processing circuit for receiving the visible light video stream and the IR video stream for generating a composite video stream including at least part of the visible light video stream superimposed with at least part of the IR video stream, the processing circuit configured to supply the composite video stream to the video display for display thereon.

According to another aspect of the present invention, an imaging system is provided for a vehicle having: a visible light video camera configured to capture a visible light video stream of a scene in a visible region of the electromagnetic spectrum; a long-range IR video camera configured to capture an IR video stream of the scene in an IR region of the electromagnetic spectrum; and a processing circuit for receiving the visible light video stream and the IR video stream for generating a composite video stream including at least part of the visible light video stream superimposed with at least part of the IR video stream, wherein the processing circuit dynamically adjusts a weight of transparency of at least one of the visible light and IR video streams in the superimposition.

According to another aspect of the present invention, a method is provided of generating a composite video stream for display in a vehicle, the method including: receiving a visible light video stream of a scene in a visible region of the electromagnetic spectrum; receiving an IR video stream of the scene in an IR region of the electromagnetic spectrum; dynamically adjusting a weight of transparency of at least one of the visible light and IR video streams; and generating a composite video stream including at least part of the visible light video stream superimposed with at least part of the IR video stream.

These and other aspects, objects, and features of the present invention will be understood and appreciated by those skilled in the art upon studying the following specification, claims, and appended drawings.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily of a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

Figures 1A, 1B:
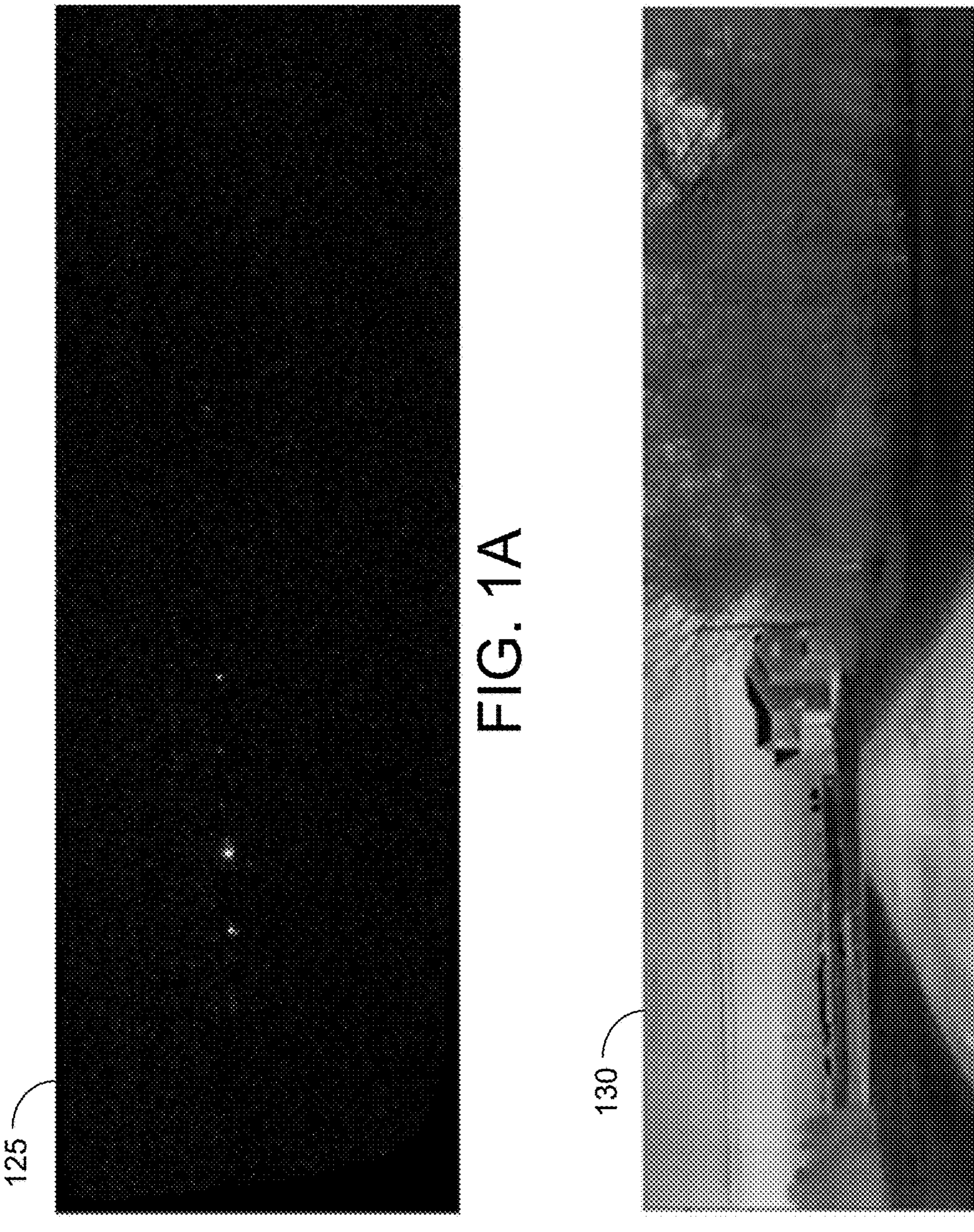
FIG. 1A is a photographic representation of an example of an image frame from a visible light video stream taken of a scene in dark conditions.
FIG. 1B is a photographic representation of an example of an image frame from an IR video stream taken of the same scene in FIG. 1A also in dark conditions.

It has become commonplace to provide cameras in a vehicle to capture images or video streams of scenes exterior of the vehicle in order to detect objects and/or display the captured images/video streams to the driver. Current color video cameras provide high resolution video with excellent color reproduction in well illuminated scenes but struggle to provide usable video in dark conditions. FIG. 1A shows an example of an image frame of a visible light video stream 125 of a scene captured in dark conditions. Conversely, long range infrared (IR) video cameras can provide video in full darkness, but this video is at a lower resolution, is greyscale, and is not "natural" in appearance. FIG. 1B shows an example of an image frame of an IR video stream 130 of a scene captured in dark conditions. Since long-range IR cameras sense thermal energy, they are capable of clearly imaging "living" objects (people, animals) in complete darkness. Accordingly, such long-range IR cameras have also been implemented in vehicles. The embodiments described below combine the strengths of each camera technology into a single composite video stream that may be displayed on a display.

Figure 2:
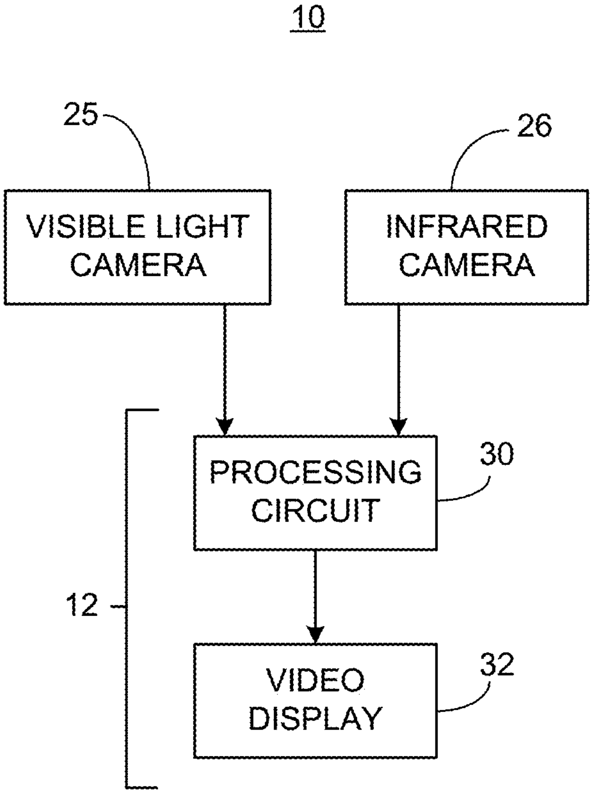
FIG. 2 is a block diagram of an imaging system according to an embodiment of the invention.

FIG. 2 shows an imaging and display system 10 according to a first embodiment. As shown, imaging and display system 10 includes a visible light video camera 25 for generating a visible light video stream 125 (FIG. 3) of a scene exterior of the vehicle, a long range infrared (IR) video camera 26 for generating an IR video stream 130 of the same exterior scene, and a display system 12, which includes a processing circuit 30 that receives the streamed video images and generates a composite video stream 120 (as discussed in detail below), and a display 32 that displays the composite video stream 120. The two video cameras 25 and 26 have at least overlapping fields of view, and preferably, the same field of view. The visible light video camera 25 may be a color camera such as a CMOS color video camera producing a RGGB, RCCB, RCCG or RYYCy video stream.

Figure 3:
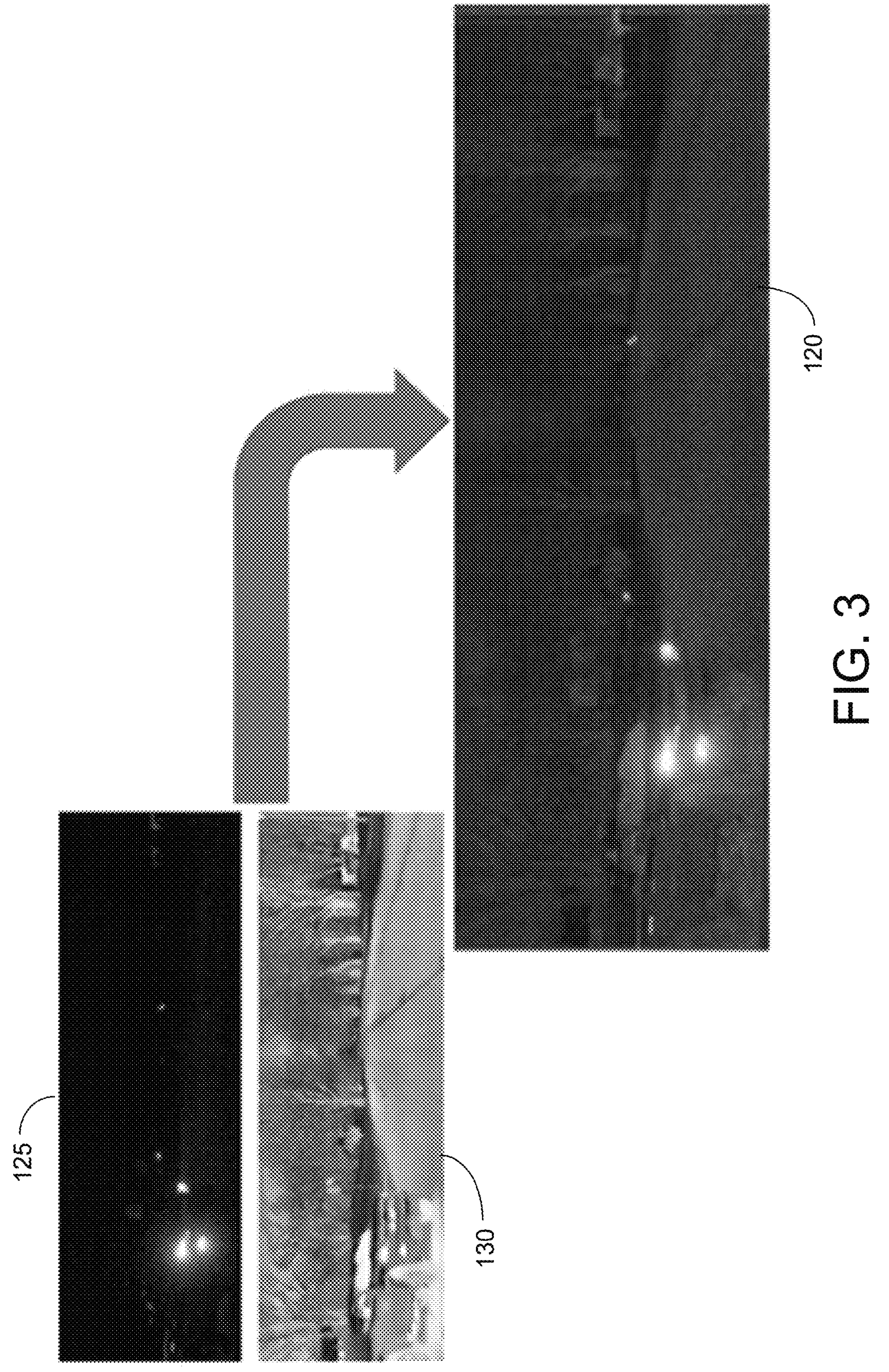
FIG. 3 is a photographic representation of an example of image frames from a visible light video stream, an IR video stream, and a resulting composite video stream that may be generated by the processing circuit shown in FIG. 2.

The processing circuit 30 may be configured to generate the composite video stream 120 as depicted in FIG. 3 in response to one or more triggering mechanisms or in response to a user input or user default selection. One such triggering mechanism may be an ambient light level. Another may be a region of the visible light video stream 125 that is dark or has low contrast. In other words, the composite video stream 120 in FIG. 3 may be generated and displayed on-demand.

The manner in which the processing circuit 30 may generate image frames forming the composite video stream 120 may take several forms. In a first example shown in FIG. 3, the processing circuit 30 overlays image frames of the visible light video stream 125 on top of image frames of the long-range IR video stream 130 to produce the image frames of the composite video stream 120. Adjusting the transparency or weight of each image frame of the visible light video stream 125 and/or IR video stream 130 allows for combined image frames in the composite video stream 120 that preserve the nighttime visibility of the IR video stream 130 and adds some color from the visible light video stream 125.

In a second example, when combining video streams from the visible light video camera 25 and the IR video camera 26, the amount of weight that the processing circuit 30 gives to the image data of each camera to achieve the optimal video quality may depend on the scene content being imaged. This optimal balance would be achieved by detecting various attributes in the scene through algorithms and then dynamically adjusting the weights of the image data from each camera to achieve the optimal blending of the video streams. Additionally, if there is a region of the color scene that is occluded, the IR video stream 130 could be combined selectively only in the occluded region of the visible light video stream 125. Examples of various scene content to be detected and adapted, include the ambient light level, presence of glare from direct or indirect sunlight, fog, and heavy rain or snow.

The detection of the ambient lighting of the scene can be achieved by the visible light video camera 25 or an ambient light sensor. This information can be used by the processing circuit 30 to strengthen the weight of the IR images in very dark scenes while maintaining the color of traffic signals and details of illuminated signs. In brighter scenes, the visible light images would be weighted more heavily leaving only the darker areas to be enhanced by the IR images.

Fog, heavy rain and snow, and smoke can be detected by a Fog Detection algorithm and/or a Visibility Range Detection algorithm (both previously developed by Gentex Corporation) to favor the IR images in the image combination for the composite video stream 120. Examples of such Fog Detection algorithms are disclosed in commonly-assigned U.S. Pat. Nos. 6,097,024; 6,681,163; and 9,514,373, and in U.S. Patent Application Publication No. US 2014/0198213A1, the entire disclosures of which are incorporated herein by reference. Examples of such Visibility Range Detection algorithms are disclosed in commonly-assigned U.S. Pat. No. 10,380,154, the entire disclosure of which is incorporated herein by reference.

Figure 4A:
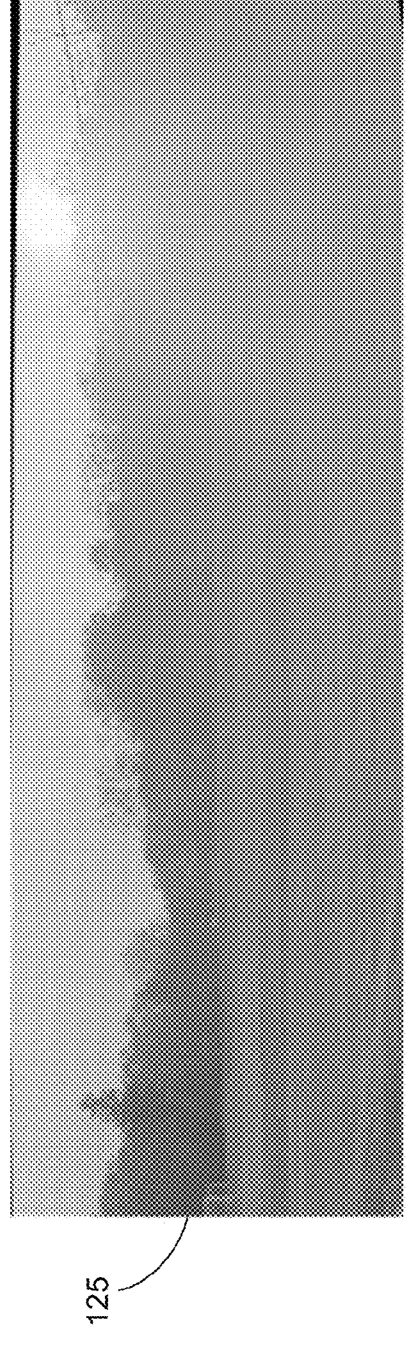
FIG. 4A is a photographic representation of an example of an image frame from a visible light video stream taken of a scene in which lens flare from direct sun is present.
Figure 4B:
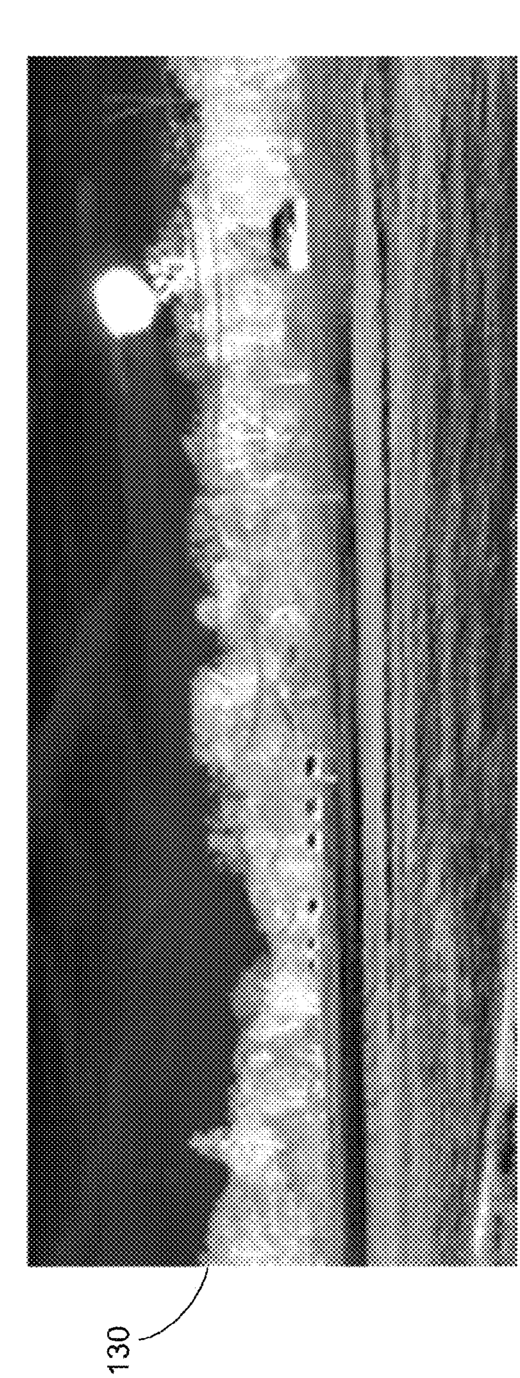
FIG. 4B is a photographic representation of an example of an image frame from an IR video stream taken of the same scene in FIG. 4A.
Figure 5A:
FIG. 5 is a photographic representation of another example of image frames from a visible light video stream, an IR video stream, and a resulting composite video stream that may be generated by the processing circuit shown in FIG. 2 where the scene has lens flare from direct sun light present.
Figure 5B:
Figure 5C:
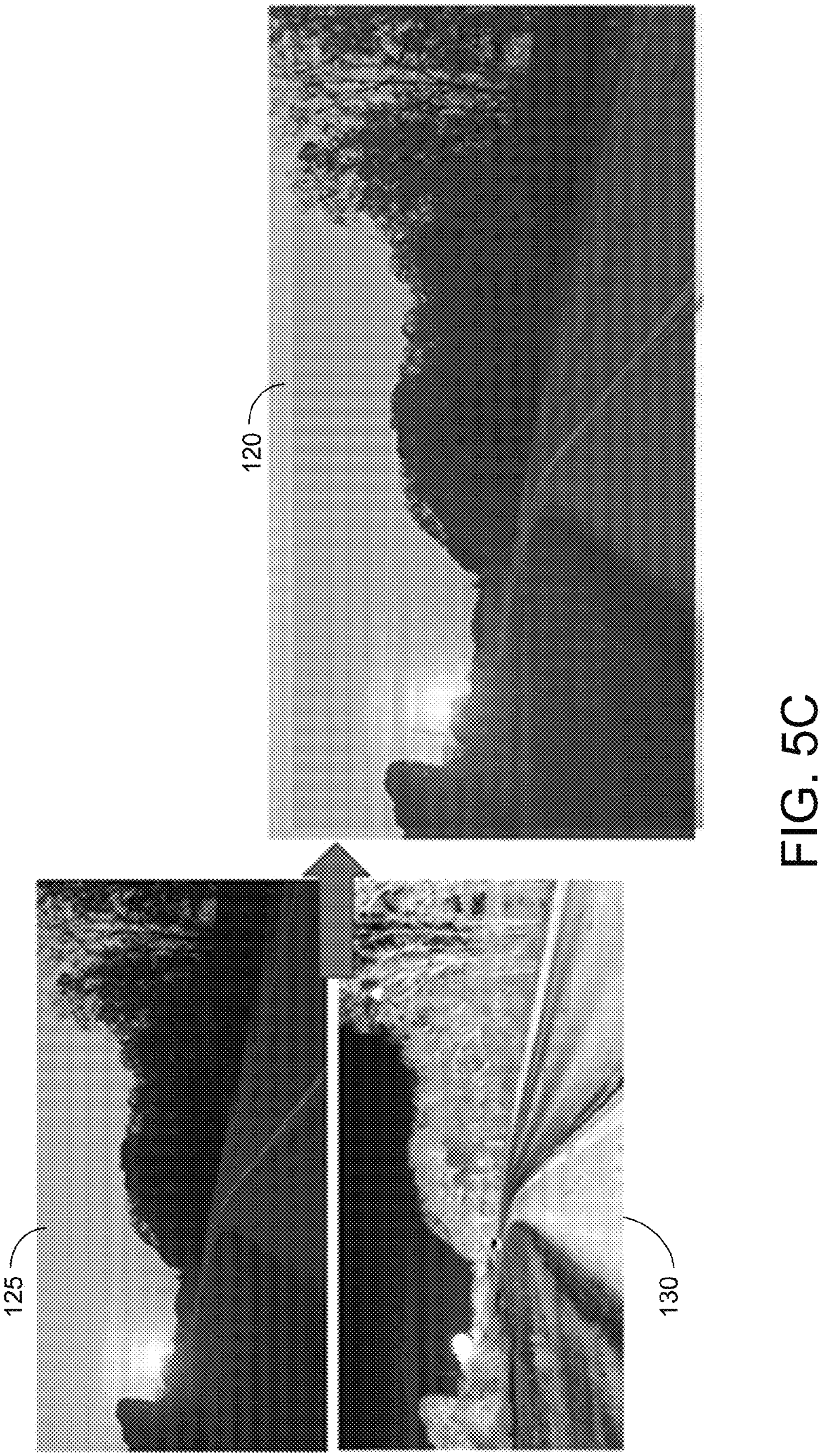

Regions in the images of the visible light video stream 125 that lack contrast but do contain content in the IR images of the IR video stream 130 can have the low contrast area regionally enhanced by the IR images. Examples include lens flare from direct sun, dark regions in shadows, and regional smoke. For purposes of example, FIGS. 4A and 5 show two examples of image frames from visible light video streams 125 in which lens flare from direct sun is present that causes objects to become difficult to see. FIGS. 4B and 5 show two examples of image frames from IR video streams 130 in which lens flare from direct sun is present but objects are visible that are barely visible in the corresponding images in FIGS. 4A and 5. FIG. 5 also shows an example of an image frame of the composite video stream 120 generated from superimposing the two visible light and IR image frames of FIG. 5.

It may also be possible to combine the visible light and IR video streams at all times and adjust the level of strength of each image relative to ambient light level or fog.

It should be noted that the video cameras 25 and 26 may be mounted so as to capture video streams 125 and 130 of a forward exterior scene, a rearward exterior scene, or a side exterior scene relative to the vehicle's direction of travel.

Figure 6:
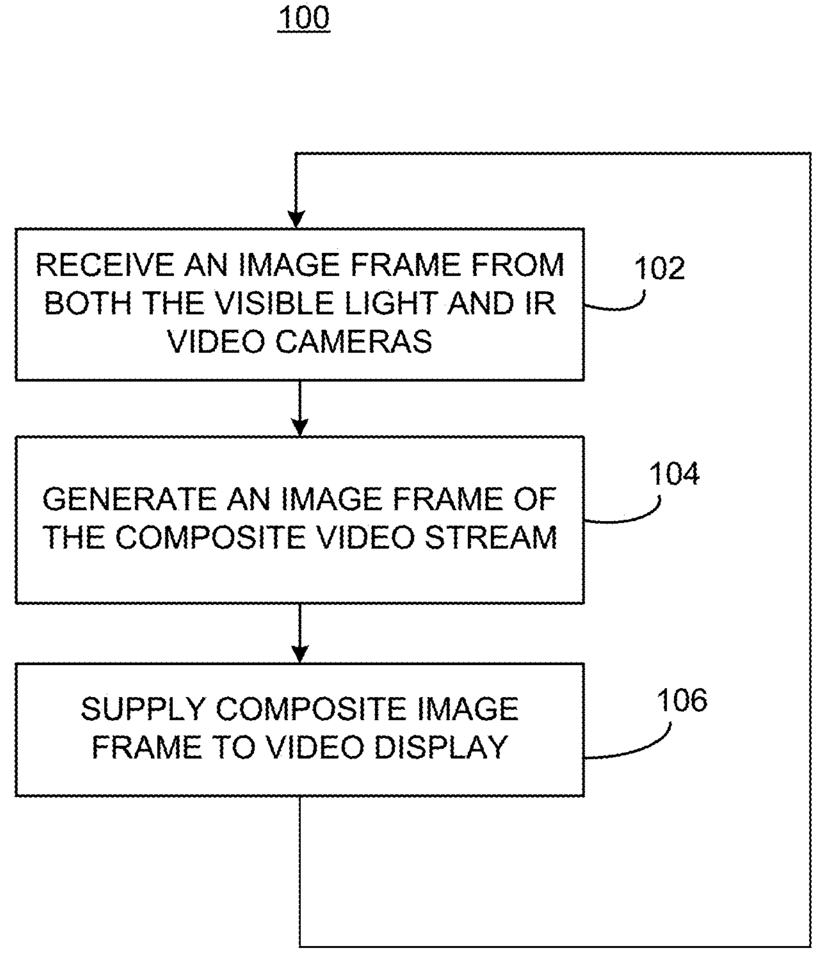
FIG. 6 is a flow chart showing the method steps performed by the processing circuit shown in FIG. 2.

FIG. 6 is a flowchart showing the steps of a method 100 performed by the processing circuit 30. In step 102, the processing circuit 30 receives the visible light video stream 125 from the visible light video camera 25 and, in step 104, receives the corresponding IR video stream 130 from the IR video camera 26. In step 106, the processing circuit 30 dynamically adjusts a weight of transparency of at least one of the received visible light video stream 125 and the received IR video stream 130. Then, in step 108, the processing circuit 30 generates the composite video stream 120 from the video streams. The processing circuit 30 may then optionally supply this composite video stream to the video display 32 for display thereon. Steps 102, 104, 106, and 108 are repeated for each sequential image frame received from visible light and IR video cameras 25 and 26 in order to generate the composite video stream.

As discussed above, step 104 may involve analysis of the received image frames to dynamically adjust the weight or region of the visible light images and/or IR images to be superimposed. Moreover, a fog detection algorithm or a visibility range detection algorithm may be executed on the received images to determine if fog, heavy rain and snow, or smoke is present.

The processing circuit 30 may include various types of image processing circuitry, digital and/or analog, and may include a microprocessor, microcontroller, application-specific integrated circuit (ASIC), graphics processing unit (GPU), or other circuitry configured to perform various input/output, control, analysis, and other functions to be described herein. In other embodiments, the image processor 30 may be a system on a chip (SoC) individually or with additional hardware components described herein.

The display system 12 may be provided anywhere within the interior of a vehicle, particularly the processing circuit 30. The video display 32 may be located where it is visible to the driver such as in the instrument panel, center console, rearview assembly, or may be implemented as a heads-up or projected display.

Figures 7A, 7B:
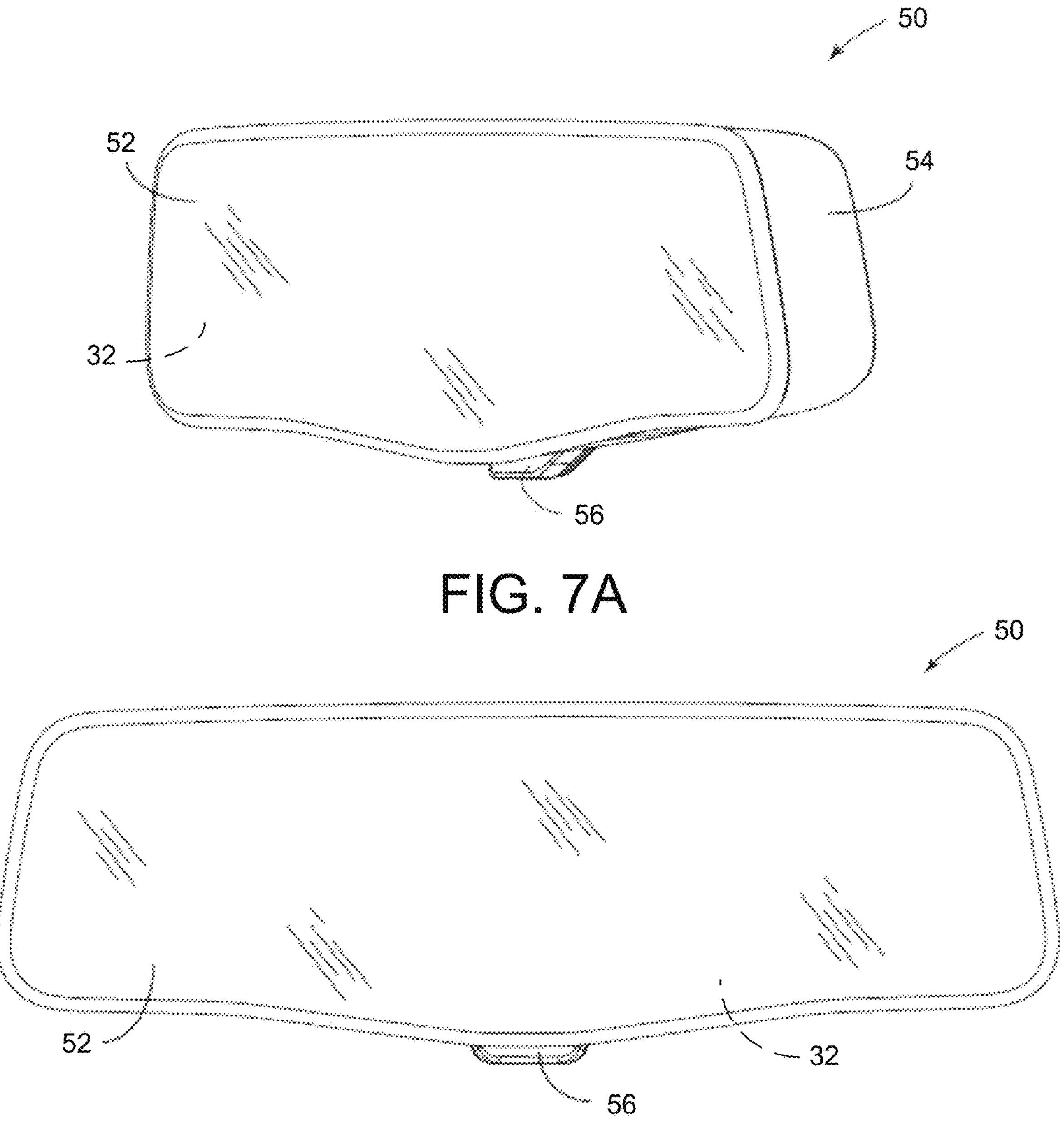
FIG. 7A is a front and side perspective view of a rearview assembly incorporating the imaging system of FIG. 2.
FIG. 7B is a front elevational view of the rearview assembly shown in FIG. 7A.

FIG. 7A is a front and side perspective view of a rearview assembly 50 incorporating the imaging and display system 10 of FIG. 2, and FIG. 7B is a front elevational view of the rearview assembly 50. The rearview assembly 50 includes a housing 54 and a transparent or semi-transparent element 52 extending across an opening in the housing 54. The display 32 is provided behind the transparent or semi-transparent element 52 so as to project the displayed composite video stream 120 therethrough when the display 32 is active. The display 32 may be activated in response to a toggle switch 56.

The transparent or semi-transparent element 52 may be a partially reflective, partially transmissive mirror element or a switchable reflective element. Examples of a switchable reflective element are disclosed in commonly-assigned U.S. Pat. Nos. 9,254,789; 9,637,054; and 9,834,146, the entire disclosures of which are hereby incorporated herein by reference. Examples of partially reflective, partially transmissive mirror elements positioned in front of a display are disclosed in commonly-assigned U.S. Patent Application Publication No. US 2015/0266427 A1, the entire disclosure of which is incorporated herein by reference.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An imaging and display system for a vehicle, comprising: a video display disposed in an interior of the vehicle;
- a visible light video camera configured to capture a visible light video stream of a scene in a visible region of the electromagnetic spectrum;
- a long-range IR video camera configured to capture an IR video stream of the scene in an IR region of the electromagnetic spectrum; and
- a processing circuit for receiving the visible light video stream and the IR video stream for generating a composite video stream including at least part of the visible light video stream superimposed with at least part of the IR video stream, the processing circuit configured to supply the composite video stream to the video display for display thereon,
- wherein the processing circuit is configured to generate the composite video stream in response to at least one triggering mechanism, and wherein the at least one triggering mechanism is at least one of: a user input, an ambient light level, a region of the visible light video stream that is dark, and a region of the visible light video stream that has low contrast,
- wherein the processing circuit dynamically adjusts a weight of at least one of the visible light and IR video streams in the superimposition, and wherein the weight of at least one of the visible light and IR video streams in the superimposition depends on scene content being imaged, wherein the scene content includes at least one of an ambient light level, presence of glare from sunlight, fog, heavy rain, and snow.

2. The imaging and display system of claim 1, wherein the weight of the superimposition is adjusted in a first region of the composite video stream different than in a second region of the composite video stream.

3. The imaging and display system of claim 2, wherein the weight of the superimposition is adjusted in the first region, increasing the weight of the IR video stream to better display an object more visible in the IR video stream than the visible light video stream.

4. The imaging and display system of claim 1, wherein the weight is a transparency weight of one of the visible light and IR video streams.

5. The imaging and display system of claim 1, wherein the visible light video camera is a color video camera and the visible light video stream is in color.

6. An imaging system for a vehicle, comprising:
- a visible light video camera configured to capture a visible light video stream of a scene in a visible region of the electromagnetic spectrum;
- a long-range IR video camera configured to capture an IR video stream of the scene in an IR region of the electromagnetic spectrum; and
- a processing circuit for receiving the visible light video stream and the IR video stream for generating a composite video stream including at least part of the visible light video stream superimposed with at least part of the IR video stream, wherein the processing circuit dynamically adjusts a weight of transparency of at least one of the visible light and IR video streams in the superimposition,
- wherein the weight of transparency of at least one of the visible light and IR video streams in the superimposition depends on scene content being imaged, wherein the scene content includes at least one of an ambient light level, presence of glare from sunlight, fog, heavy rain, and snow.

7. The imaging system of claim 6, wherein the weight of transparency is adjusted in a first region of the composite video stream different than in a second region of the composite video stream.

8. The imaging system of claim 7, wherein the weight of the transparency is adjusted in the first region, increasing the weight of the IR video stream to better display an object in the first region that is more visible in the IR video stream than the visible light video stream.

9. The imaging system of claim 6, wherein the processing circuit is configured to generate the composite video stream in response to at least one triggering mechanism, wherein the at least one triggering mechanism is at least one of: a user input, an ambient light level, a region of the visible light video stream that is dark, and a region of the visible light video stream that has low contrast.

10. A method of generating a composite video stream for display in a vehicle, the method comprising:
- receiving a visible light video stream of a scene in a visible region of the electromagnetic spectrum;
- receiving an IR video stream of the scene in an IR region of the electromagnetic spectrum;
- dynamically adjusting a weight of transparency of at least one of the visible light and IR video streams; and
- generating a composite video stream including at least part of the visible light video stream superimposed with at least part of the IR video stream,
- wherein the weight of transparency of at least one of the visible light and IR video streams in the superimposition depends on scene content being imaged, wherein the scene content includes at least one of an ambient light level, presence of glare from sunlight, fog, heavy rain, and snow.

11. The method of claim 10, wherein the weight of transparency is adjusted in a first region of the composite video stream different than in a second region of the composite video stream.

12. The method of claim 11, wherein the weight of the transparency is adjusted in the first region, increasing the weight of the IR video stream to better display an object in the first region that is more visible in the IR video stream than the visible light video stream.

13. The method of claim 10 and further comprising detecting a triggering mechanism and conditionally performing the generating step upon detection of a triggering mechanism.

14. The method of claim 13, wherein the at least one triggering mechanism is at least one of: a user input, an ambient light level, a region of the visible light video stream that is dark, and a region of the visible light video stream that has low contrast.

* * * * *